United States Patent
Watanabe

(10) Patent No.: US 8,207,868 B2
(45) Date of Patent: Jun. 26, 2012

(54) DISPLAY DEVICE

(75) Inventor: Kazuya Watanabe, Anjo (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/062,855

(22) PCT Filed: Dec. 8, 2009

(86) PCT No.: PCT/JP2009/070548
§ 371 (c)(1), (2), (4) Date: Mar. 8, 2011

(87) PCT Pub. No.: WO2010/071053
PCT Pub. Date: Jun. 24, 2010

(65) Prior Publication Data
US 2011/0166782 A1    Jul. 7, 2011

(30) Foreign Application Priority Data

Dec. 18, 2008 (JP) .................................. 2008-322691
Dec. 18, 2008 (JP) .................................. 2008-322692

(51) Int. Cl.
*G08G 1/123* (2006.01)
*B60Q 1/00* (2006.01)
*G01S 13/00* (2006.01)

(52) U.S. Cl. .................... 340/995.17; 340/461; 342/176

(58) Field of Classification Search .................. 701/208, 701/432; 348/118, E7.087; 340/995.17, 340/461, 525; 342/176
See application file for complete search history.

(56) References Cited

U.S. PATENT DOCUMENTS

| 6,940,423 | B2 * | 9/2005 | Takagi et al. ............... 340/932.2 |
| 7,728,879 | B2 * | 6/2010 | Ishii ........................... 348/222.1 |
| 7,999,801 | B1 * | 8/2011 | Priem .......................... 345/204 |
| 2008/0043113 | A1 | 2/2008 | Ishii |
| 2009/0112462 | A1 * | 4/2009 | Lo ................................ 701/209 |

FOREIGN PATENT DOCUMENTS

| JP | 09-101158 A | 4/1997 |
| JP | 10217852 A | 8/1998 |
| JP | 2000-201347 A | 7/2000 |
| JP | 2000-242891 A | 9/2000 |
| JP | 2008-048345 A | 2/2008 |

OTHER PUBLICATIONS

International Search Report for PCT/JP2009/070548, dated Feb. 9, 2010.

* cited by examiner

*Primary Examiner* — James Trammell
*Assistant Examiner* — Muhammad Shafi
(74) *Attorney, Agent, or Firm* — Sughrue Mion, PLLC

(57) ABSTRACT

A display device includes a camera for capturing an image around a vehicle body; a monitor provided in a vehicle interior; and a display control unit for controlling a display of the monitor. The monitor has a rectangle-shaped display face, and is supported switchably between a vertically elongated posture and a horizontally elongated posture. When the monitor is switched to the vertically elongated posture, based on an image captured by the camera, the display control unit displays a top view image of a road surface around the vehicle body seen from above on the monitor.

6 Claims, 14 Drawing Sheets

DISPLAY DEVICE

CROSS REFERENCE TO RELATED APPLICATIONS

This application is a National Stage of International Application No. PCT/JP2009/070548 filed Dec. 8, 2009, claiming priority based on Japanese Patent Application No. 2008-322691 filed Dec. 18, 2008 and Japanese Patent Application No. 2008-322692 filed Dec. 18, 2008, the contents of all of which are incorporated herein by reference in their entirety.

TECHNICAL FIELD

The present invention relates to a display device, particularly to a technique for displaying an image captured by an on-board camera on a monitor provided in a vehicle interior of an automobile or the like.

BACKGROUND ART

As a display device configured as described above, Patent Document 1 describes a display (monitor in the present invention) having a first side and a second side longer than the first side, provided in a vehicle interior. This display is configured to be switchable between a horizontally oriented state and a vertically oriented state and is provided with a switch for detecting the state (posture of the display). In addition, a camera for capturing an image of a road surface on a lateral side of a vehicle body is provided in a door mirror housing on a left side (or passenger seat side), and a navigation device for acquiring navigation information corresponding to a current location of the vehicle body is further provided. When the display is in the horizontally oriented state, the navigation information from the navigation device is displayed in accordance with a state of the switch, and when the display is in the vertically oriented state, the image captured by the camera is displayed in accordance with the state of the switch.

Patent Document 2 describes the display device including: a camera for capturing an image rearward of the vehicle body; a normal picture output device for outputting a normal picture, such as navigation picture and forward picture; and a microcomputer for inputting a position of a shift lever and a vehicle speed signal. In Patent Document 2, a shift to a parking travel mode is performed based on a shift position and a vehicle speed, and a rearward picture from the camera, instead of the normal picture, is displayed on the monitor. Once the mode is shifted to the parking travel mode, as long as a predetermined vehicle speed is met, the rearward picture from the camera is displayed on the monitor, regardless of the shift position of the shift lever.

Citation List

Patent Document

Patent Document 1: Japanese Unexamined Patent Application Publication No. 2000-201347 (paragraphs [0018], [0019] and FIG. 9)

Patent Document 2: Japanese Unexamined Patent Application Publication No. 10-217852 (paragraphs [0016]-[0022], and FIGS. 1 and 2)

SUMMARY OF INVENTION

Technical Problem

When the vehicle body is moved backward for leading the vehicle body to the parking position, a driver checks a presence of an obstacle and the road surface rearward of the vehicle body as well as those on the passenger seat side.

However the technique of Patent Document 2 merely displays the captured image rearward of the vehicle body on the monitor, through an operation of the shift lever. On the other hand, the technique of Patent Document 1 merely displays a captured image of the road surface on the passenger seat side on the monitor, instead of a navigation image, by switching a posture of the monitor. Accordingly, it may be considered to provide switches for selecting the image rearward of the vehicle body and an image of the road surface on the lateral side of the vehicle body and for displaying the selected image. However, providing the switches may result in complicated operation, and thus in poor operability.

Especially in a driving situation, such as parking operation, a driver tends to give preference to safety, and thus, for example, may refrain from operating a switch with which the driver does not exactly understand its purpose. As a result, the switch and in turn the function regarding the switch may not be utilized. Therefore, there has been a demand for a switch that can be intuitively understood by the driver.

When the vehicle body is moved backward during the parking operation, it is desirable from a viewpoint of visibility that the road surface condition or a position of the obstacle on a rear side of the vehicle body is displayed on a wide screen oriented in a horizontal direction. It is also desirable from the viewpoint of visibility that the road surface condition or the position of the obstacle on the lateral side of the vehicle body which is difficult to be visually checked from the driver's seat is displayed on a long screen extending in a vertical direction which follows a front-rear direction of the vehicle body.

When such a visibility is taken into account, it can be said that the posture of the monitor and the image displayed on the monitor are closely related to each other, and therefore, it has been demanded to reasonably combine the posture of the monitor and the image to be displayed without necessity of complicated operations.

An object of the present invention is to reasonably configure the display device for displaying the condition of the road surface and the presence of the obstacle around the vehicle body on the monitor during parking of the vehicle body, without effort but with excellent visibility.

Solution to Problem

The feature of the present invention lies in that a display device includes: a camera for capturing an image around a vehicle body; a monitor provided in a vehicle interior; and a display control unit for controlling a display on the monitor, the monitor having a rectangle-shaped display face, and being supported switchably between a vertically elongated posture and a horizontally elongated posture, and the display control unit displaying a top view image of a road surface around the vehicle body seen from above on the monitor, based on an image captured by the camera, when the monitor is switched to the vertically elongated posture.

With this configuration, when the monitor is switched to the vertically elongated posture, even though the switches are not operated, the image of surroundings of the vehicle body seen from above can be displayed lengthwise along the front-rear direction of the vehicle body, and therefore, the driver can check the surroundings of the vehicle body without effort. As a result, the display device can be configured in such a manner that the road surface condition and the presence of the obstacle on the rear side and the lateral side of the vehicle body can be displayed on the monitor during the parking of the vehicle body, without effort but with excellent visibility.

In the present invention, the display control unit may be configured to display the image captured by the camera on the monitor, when the monitor is switched to the horizontally elongated posture. With this configuration, by simply changing the posture of the monitor to the horizontally elongated posture, the image captured by the camera can be displayed as-is on the monitor, and thus the surroundings of the vehicle body can be checked with a simple operation.

The display device according to the present invention may further include a shift position sensor for detecting a shift position of a transmission device of the vehicle body, the camera may be a rear camera for capturing an image rearward of the vehicle body, and the display control unit may be configured to shift a display mode to a rearward image display mode in which an image captured by the rear camera is displayed on the monitor, when the monitor is set to the horizontally elongated posture and the shift position sensor detects that the shift position is set to a reverse position.

With this configuration, when the vehicle body moves backward, the image captured by the rear camera is displayed on the monitor in the horizontally elongated posture, and when the monitor is switched to the vertically elongated posture, the top view image is displayed on the monitor. In other words, in a situation where the vehicle body is moved backward, the condition rearward of the vehicle body displayed on the monitor in the horizontally elongated posture can be recognized. In addition, in this display state, when the monitor is switched to the vertically elongated posture, even though the switches are not operated, the image of surroundings of the vehicle body seen from above can be displayed lengthwise along the front-rear direction of the vehicle body, and therefore, the driver can check the surroundings of the vehicle body without effort.

The display device according to the present invention may further include a viewpoint conversion unit for converting at least the image captured by the rear camera into a bird's-eye image seen from above the vehicle body, wherein the display control unit displays the bird's-eye image on the monitor as the top view image when the display mode is in the top view image display mode. According to this configuration, in the top view image display mode, the bird's-eye image is displayed on the monitor to allow recognition of the road surface condition around the vehicle body.

The display device according to the present invention may further include a side camera for capturing from above the road surface near a side part of the vehicle body to obtain a side image, wherein the display control unit displays the side image on the monitor as the top view image when the display mode is in the top view image display mode. According to this configuration, in the top view image display mode, the side image is displayed on the monitor to allow the recognition of the road surface condition around the vehicle body.

The display device according to the present invention may further include: a viewpoint conversion unit for converting at least the image captured by the rear camera into a bird's-eye image seen from above the vehicle body; and a side camera for capturing from above the road surface near a side part of the vehicle body to obtain a side image, wherein the display control unit selects one of the bird's-eye image and the side image in accordance with an operation of a display selection switch and displays the selected image on the monitor as the top view image, when the display mode is in the top view image display mode. According to this configuration, in the top view image display mode, one of the bird's-eye image and the side image is selected by the display selection switch and displayed on the monitor, to allow the recognition of the road surface condition around the vehicle body.

The display device according to the present invention may further include a navigation system for acquiring a position of the vehicle body as position information represented by the terrestrial longitude and latitude and generating a navigation image in which a position specified by the acquired position information is indicated on a corresponding map, wherein the display control unit performs a processing of a navigation image display mode in which the navigation image is displayed instead of the top view image, when the monitor in the top view image display mode is switched to the horizontally elongated posture and the shift position is in a position other than the reverse position. According to this configuration, when the monitor in the top view image display mode is switched to the horizontally elongated posture and the shift position is in the position other than the reverse position, the navigation image is displayed on the monitor, to allow the recognition of the position of the vehicle body on the map.

In the present invention, the display control unit may perform a processing of the rearward image display mode in which the image captured by the rear camera is displayed on the monitor instead of the top view image, when the monitor in the top view image display mode is switched to the horizontally elongated posture and the shift position is in the reverse position. According to this configuration, when the monitor in the top view image display mode is switched to the horizontally elongated posture and the shift position is in the reverse position, a rearward image captured by the rear camera is displayed on the monitor. In other words, the image of the view in the moving direction of the vehicle body (rear view) is displayed on the monitor, to thereby facilitate the checking of the condition rearward of the vehicle body.

In the present invention, the display control unit may be configured to display an image obtained by enlarging the side image as the top view image, when the display mode is in the top view image display mode, the monitor displaying the side image as the top view image is switched to the horizontally elongated posture and the shift position is in a position other than the reverse position. With this configuration, when the side image is displayed as the top view image, the shift position is set to the position other than the reverse position and the monitor is switched to the horizontally elongated posture, the image obtained by enlarging the side image is displayed as the top view image. With this configuration, details in the vicinity of the vehicle body can be checked.

In the present invention, the camera may include: a right side camera for capturing the road surface on a right side of the vehicle body; and a left side camera for capturing the road surface on a left side of the vehicle body, the horizontally elongated posture of the monitor may be set as a standard posture, the monitor may be supported switchably between the standard posture and a right rotation posture which is the vertically elongated posture obtained by rotating the monitor in the standard posture to the right in which a right end side of the monitor is moved downward, or between the standard posture and a left rotation posture which is the vertically elongated posture obtained by rotating the monitor in the standard posture to the left in which a left end side of the monitor is moved downward, and the display control unit may be configured to perform a processing of a side image display mode in which: a standard image is displayed, when the monitor is in the standard posture; an image captured by the right side camera is displayed on the monitor as the top view image, when the monitor is switched from the standard posture to the right rotation posture; and an image captured by the left side camera is displayed on the monitor as the top view image, when the monitor is switched from the standard posture to the left rotation posture.

With this configuration, when the standard image is displayed on the monitor and the monitor is switched to the left rotation posture, the image captured by the left side camera is displayed on the monitor as the top view image. Conversely, when the monitor is rotated to the right, the image captured by the right side camera is displayed on the monitor as the top view image. In other words, when a region on the lateral side of the vehicle body is displayed on the monitor, by setting the monitor to the vertically elongated posture, a long region along the vehicle body extending in the front-rear direction is displayed, and thus useless display areas are eliminated. Moreover, since the processing in the mode of switching the displayed subject on the monitor (shift in the mode) is performed by rotating the monitor to the left for checking the left side of the vehicle body and by rotating the monitor to the right for checking the right side of the vehicle body, uncomfortable feeling in operation is eliminated to enable an intuitive operation. As a result, the display device is provided for displaying the road surface condition and the presence of the obstacle on the lateral side of the vehicle body on the monitor during parking of the vehicle body, with excellent visibility.

The feature of the present invention lies in that the display device includes: a right side camera for capturing the road surface on a right side of the vehicle body; and a left side camera for capturing the road surface on a left side of the vehicle body; a monitor provided in a vehicle interior; and a display control unit for controlling a display on the monitor, the monitor having a rectangle-shaped display face, wherein the horizontally elongated posture of the monitor is set as a standard posture, and the monitor is supported switchably between the standard posture and a right rotation posture which is the vertically elongated posture obtained by rotating the monitor in the standard posture to the right in which a right end side of the monitor is moved downward, or between the standard posture and a left rotation posture which is the vertically elongated posture obtained by rotating the monitor in the standard posture to the left in which a left end side of the monitor is moved downward, and the display control unit performs a processing of a side image display mode in which: a standard image is displayed, when the monitor is in the standard posture; an image captured by the right side camera is displayed on the monitor, when the monitor is switched from the standard posture to the right rotation posture; and an image captured by the left side camera is displayed on the monitor, when the monitor is switched from the standard posture to the left rotation posture.

With this configuration, when the standard image is displayed on the monitor and the monitor is switched to the left rotation posture, the image captured by the left side camera is displayed on the monitor. Conversely, when the monitor is rotated to the right, the image captured by the right side camera is displayed on the monitor. In other words, when the region on the lateral side of the vehicle body is displayed on the monitor, by setting the monitor to the vertically elongated posture, the long region along the vehicle body in the front-rear direction is displayed, and thus the useless display areas are eliminated. Moreover, since the processing in the mode of switching the displayed subject on the monitor (shift in the mode) is performed by rotating the monitor the left for checking the left side of the vehicle body and by rotating the monitor to the right for checking the right side of the vehicle body, the uncomfortable feeling in operation is eliminated to enable the intuitive operation. As a result, the display device is provided for displaying the road surface condition and the presence of the obstacle on the lateral side of the vehicle body on the monitor during parking of the vehicle body, with excellent visibility.

The present invention may further include a front camera for capturing an image forward of the vehicle body, wherein the display control unit performs a processing of a forward image display mode in which an image captured by the front camera is displayed on the monitor as the standard image. According to this configuration, the region forward of the vehicle body is displayed on the monitor when the monitor is in the standard posture, and thus checking of the forward condition is facilitated.

The present invention may further include a rear camera for capturing an image rearward of the vehicle body, wherein the display control unit performs a processing of a rearward image display mode in which an image captured by the rear camera is displayed on the monitor as the standard image. According to this configuration, the region rearward of the vehicle body is displayed on the monitor when the monitor is in the standard posture, and thus checking of the rearward condition is facilitated.

The present invention may further include a navigation system for acquiring a position of the vehicle body as position information represented by the terrestrial longitude and latitude and generating a navigation image in which a position specified by the acquired position information is indicated on a corresponding map, wherein the display control unit performs a processing of a navigation image display mode in which the navigation image is displayed as the standard image. According to this configuration, the navigation image is displayed on the monitor when the monitor is in the standard posture, and thus the checking of the position of the vehicle body on the map is facilitated.

The present invention may further include: a front camera for capturing an image forward of the vehicle body; a rear camera for capturing an image rearward of the vehicle body; and a shift position sensor for detecting a shift position of a transmission device of the vehicle body, wherein the display control unit performs a processing of a forward image display mode in which an image captured by the front camera is displayed on the monitor as the standard image, and a processing of a rearward image display mode in which an image captured by the rear camera is displayed on the monitor as the standard image, when the forward image display mode is performed and the shift position sensor detects that the shift position is operated to a reverse position.

According to this configuration, when the image captured by the front camera is displayed on the monitor and the shift position of the transmission device is operated to the reverse position, the image captured by the rear camera is displayed on the monitor. When the monitor displaying the image captured by the front camera or the rear camera is rotated to the left, the image captured by the left side camera is displayed on the monitor, and conversely, when the monitor is rotated to the right, the image captured by the right side camera is displayed on the monitor.

Advantageous Effects of Invention

The present invention exerts an effect that the road surface condition and the presence of the obstacle on the rear side and the lateral side of the vehicle body can be displayed on the monitor during the parking of the vehicle body, without effort but with excellent visibility.

DESCRIPTION OF EMBODIMENTS

<First Embodiment>

Hereinbelow, a first embodiment of the present invention will be described with reference to the drawings.

<Overall Configuration>

Figure 1:
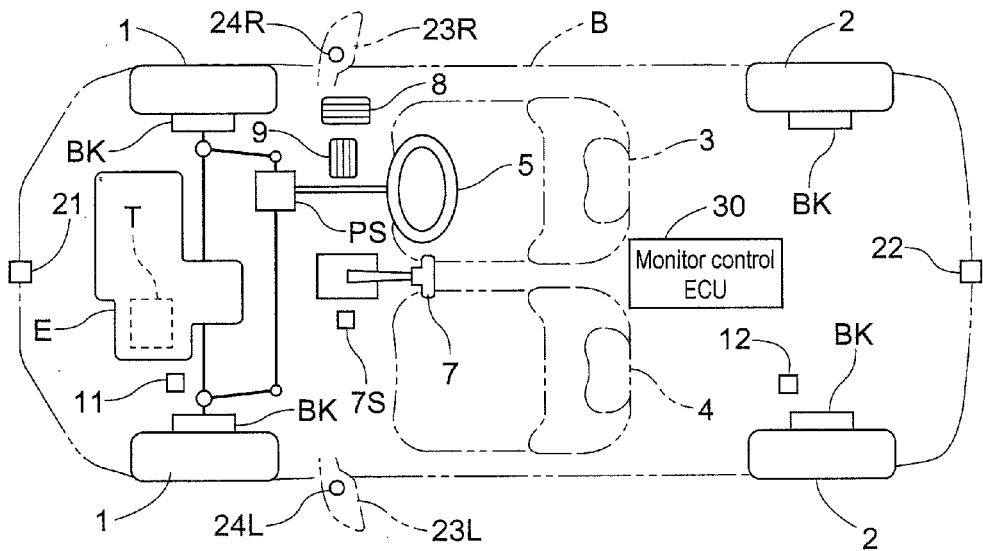
FIG. 1 is a plan view showing an overview of a vehicle body.
Figure 2:
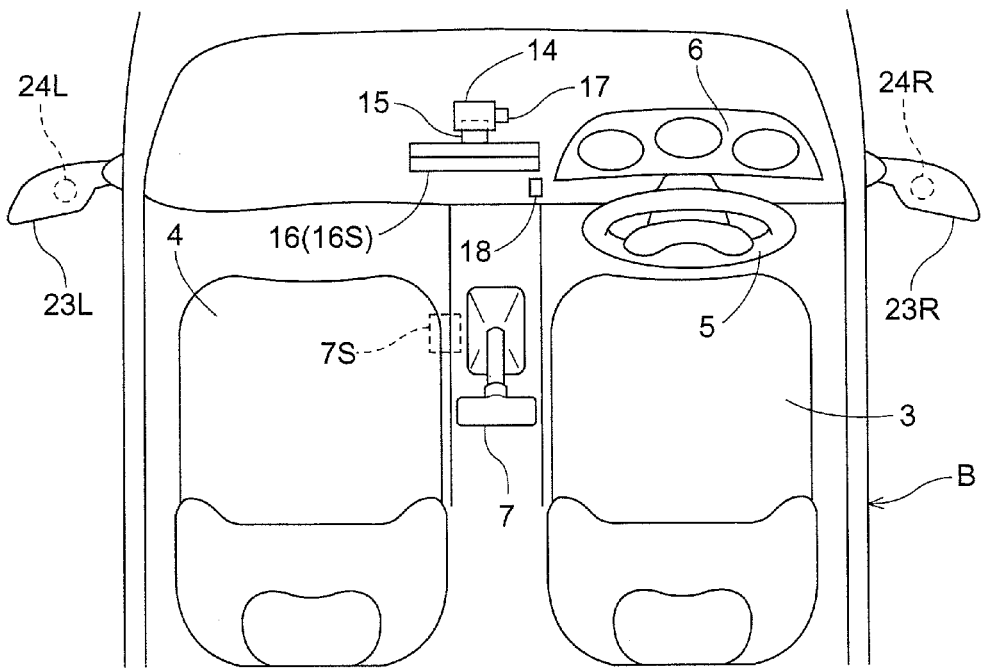
FIG. 2 is a plan view showing a portion near a driver's seat in a first embodiment.
Figure 3:
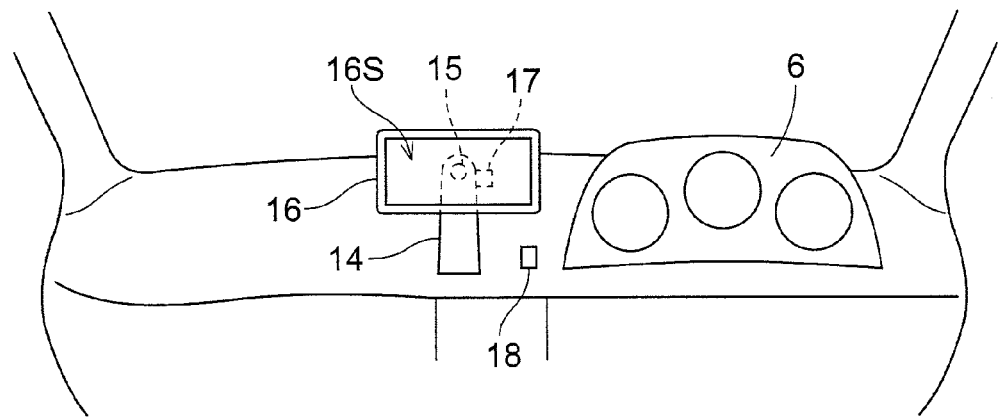
FIG. 3 is a diagram showing an arrangement of a monitor in the first embodiment.

As shown in FIGS. 1-3, a passenger vehicle of the present embodiment has a driver's seat 3 and a passenger seat 4 in a vehicle interior of a vehicle body B with front wheels 1 and rear wheels 2. A steering wheel 5 and a panel 6 with meters are disposed frontward of the driver's seat 3, and a shift lever 7 for shifting gears is disposed on a lateral side of the driver's seat 3.

In a front portion of the vehicle body B of this passenger vehicle, there are disposed an engine E and a transmission device T formed of a torque converter, a CVT and the like for shifting power from the engine E and transmitting the shifted power to the front wheels 1. In the front portion, a power steering unit PS is provided which is for transmitting a rotational manipulation force of the steering wheel 5 as steering force to the front wheels 1. With this configuration, the front wheels 1 can function as driving wheels and at the same time as steered wheels.

A gear shift operation of the transmission device T is performed using the shift lever 7. By setting a shift position of the shift lever 7, a state of the vehicle body B, including forward movement, backward movement, parking and the like, is achieved, and in the vicinity of the shift lever 7, a shift position sensor 7S for detecting the shift position is provided. It should be noted that a gear shift setting of the transmission device T may be directly detected, by providing the shift position sensor 7S on the transmission device T.

In the vicinity of the driver's seat 3, there are provided in parallel an accelerator pedal 8 for controlling a running speed, and a brake pedal 9 for operating braking devices BK for the front wheels 1 and the rear wheels 2 to apply braking force on the front wheels 1 and the rear wheels 2.

In the vicinity of the front wheel 1, there is provided a steering angle sensor 11 for detecting a steering angle. On the other hand, in the vicinity of the rear wheel 2, there is provided a moving distance sensor 12 for measuring a moving distance of the vehicle body B from a rotation amount of the rear wheel 2.

Figure 4:
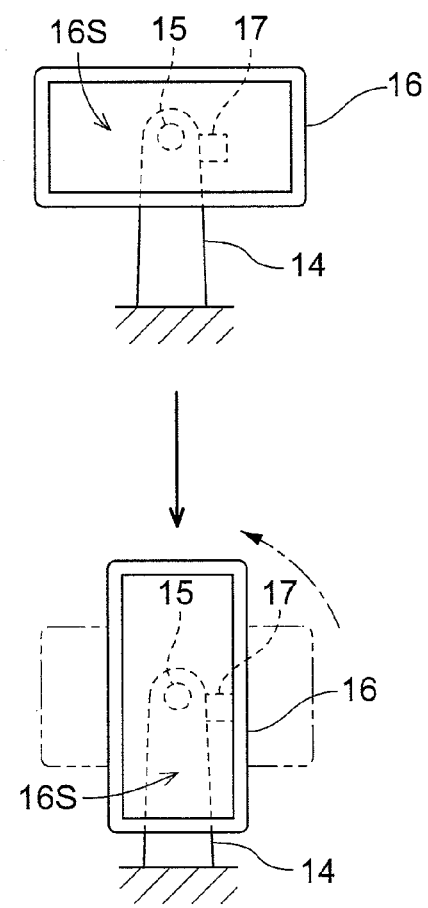
FIG. 4 is a diagram showing a rotational posture change of the monitor in the first embodiment.

A bracket 14 is provided in an upper portion of a console in the vicinity of the driver's seat 3, and on an upper end of the bracket 14, a monitor 16 is supported rotatably by a rotation shaft 15 extending in a front-rear direction. A display face 16S of the monitor 16 is rectangle-shaped, and is switchable between a horizontally elongated posture and a vertically elongated posture shown in FIG. 4, through a rotation about the rotation shaft 15 by a manual operation.

Specifically, the monitor 16 can be switched to either the horizontally elongated posture or the vertically elongated posture, through a rotation in a range of 90 degrees about the rotation shaft 15. In the vicinity of the rotation shaft 15, there is provided a monitor posture sensor 17 for detecting either the horizontally elongated posture or the vertically elongated posture. In addition, in the vicinity of the panel 6, there is provided a display selection switch 18 for selecting an image to be displayed when the monitor 16 is in the vertically elongated posture.

The display selection switch 18 may be of a momentary type or a toggle-type. In a case of the momentary type, due to a control by a display mode selecting section 35 (see FIG. 5), a display is switched every time the display selection switch 18 is operated. It should be noted that a liquid crystal type monitor with a backlight is assumed as the monitor 16, or alternatively, the monitor 16 may be of a plasma display type, an organic ELD type, or a CRT type.

In addition, in a case of the monitor 16 whose display face has a touch panel, the display selection switch 18 may be displayed as operation button on the monitor 16. With this configuration, the number of switches having electrical contact can be reduced.

Especially, in the present invention, an electric motor may be provided for a purpose of changing the posture of the monitor 16. Specifically, a configuration may be adopted in which a rotation of the monitor 16 is assisted by an actuation of the electric motor in a direction of an operation when a pressure sensor or the like senses a man-made manipulation force that rotates the monitor 16, or in which the monitor 16 rotates independently. Likewise, a switch for controlling the actuation of the electric motor may provided, and a configuration may be adopted in which the electric motor is controlled in such a manner that, when the switch is operated, the monitor 16 is switched to the vertically elongated posture, and when the switch is operated again, the monitor 16 is returned to the horizontally elongated posture. This switch as well may be displayed as operation button on the touch panel.

On a front end of the vehicle body B, a front camera 21 for capturing a region including a road surface on a front side of the vehicle body is provided, and on a rear end of the vehicle body B, a rear camera 22 for capturing a region including the road surface on a rear side of the vehicle body is provided.

On a left side door, there is provided a left side mirror 23L whose housing contains a left side camera 24L for capturing, from above, a region of the road surface in the vicinity of a left side of the vehicle body ranging from the front end to the rear end of the vehicle body B. Likewise, on a right side door, there is provided a right side mirror 23R whose housing contains a right side camera 24R for capturing, from above, a region of the road surface in the vicinity of a right side of the vehicle body ranging from the front end to the rear end of the vehicle body B. It should be noted that the left side camera 24L and the right side camera 24R may be perpendicularly oriented relative to the road surface, or alternatively, may be inclined in a range in which the camera can capture the road surface from above.

Each of these cameras includes an imaging optical system with a wide-angle lens, and an imaging element of a CCD type or a CMOS type, and has a function of outputting the captured images as moving picture at a speed of more than several images per second.

Figure 5:
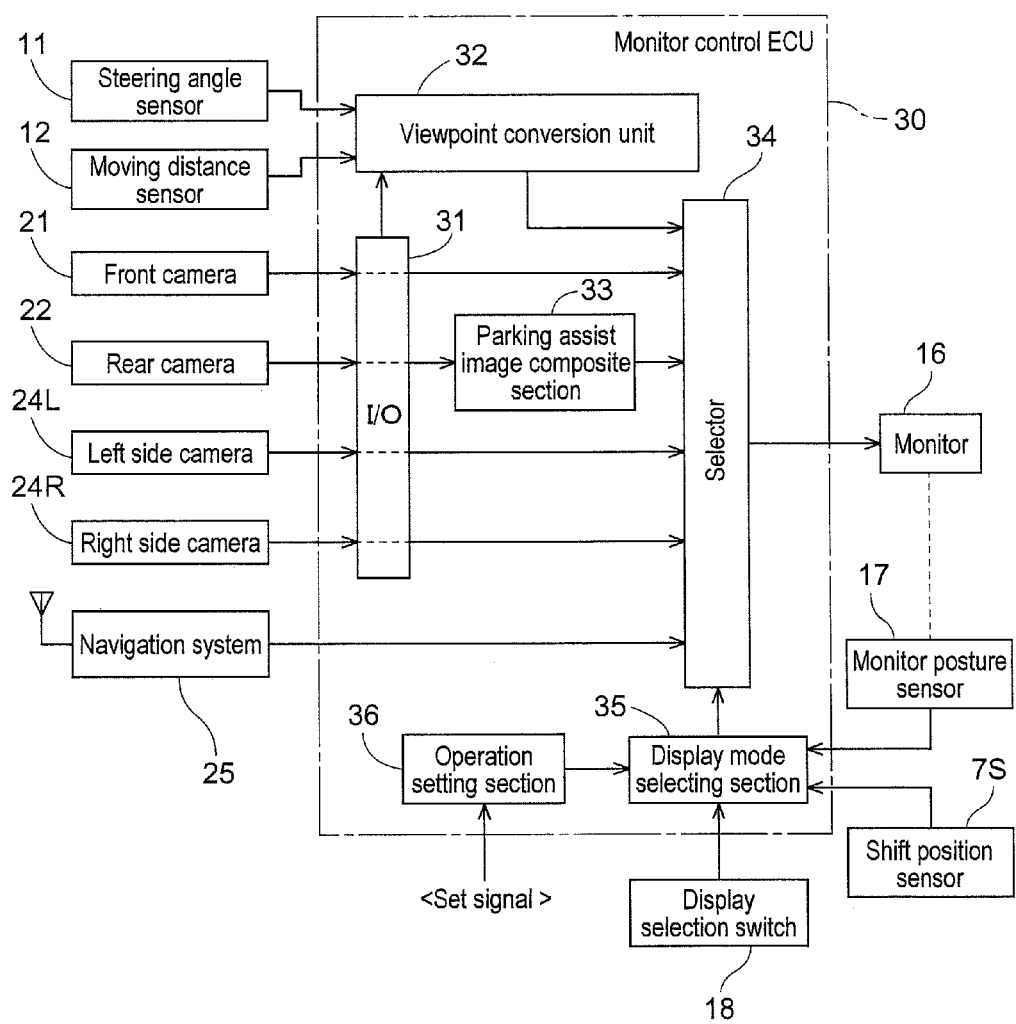
FIG. 5 is a block circuit diagram showing a control system in the first embodiment.

The passenger vehicle is provided with a navigation system 25 for acquiring a position of the vehicle body B as position information represented by the terrestrial longitude and latitude by receiving radio signals from GPS satellites, and for generating a navigation image in which a position specified by the acquired position information is indicated on a corresponding map (see FIG. 5).

Figure 7:
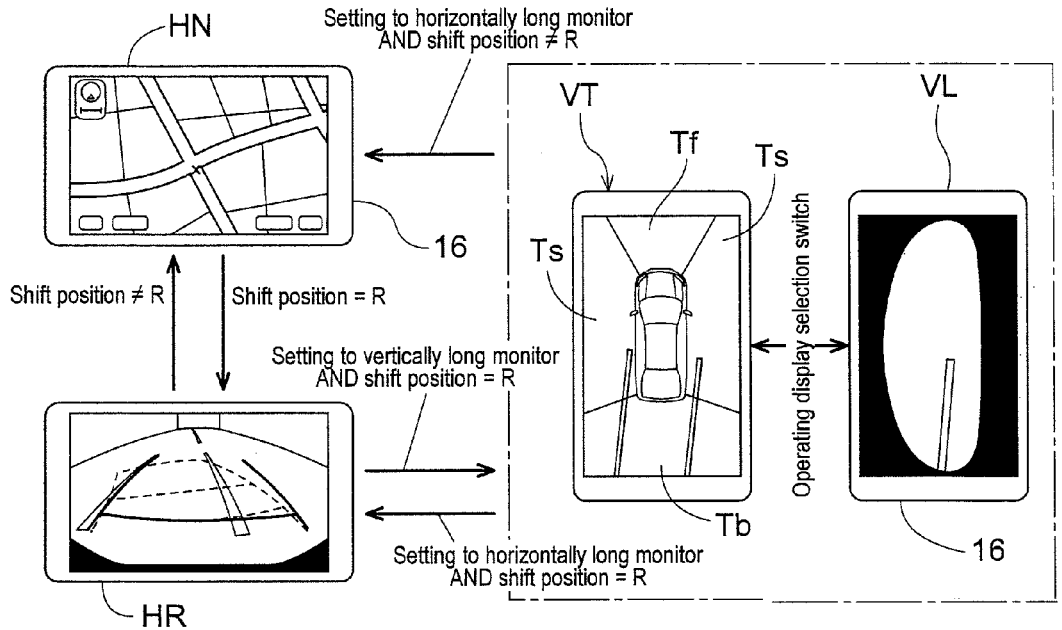
FIG. 7 is a diagram showing a posture of the monitor and an image displayed on the monitor in the first embodiment.

As shown in FIG. 7, the monitor 16 displays any one of the navigation image (HN) generated by the navigation system 25, a rearward image (HR) captured by the rear camera 22, a side image (VL) captured by the left side camera 24L, and a bird's-eye image (VT). The side image (VL) captured by the left side camera 24L and the bird's-eye image (VT) correspond to the top view image in the present invention.

Since the left side camera 24L captures, from above, the road surface near a side part of the left side of the vehicle body B, the side image (VL) includes a road surface image, and an image of a part of the vehicle body B may also be contained. Likewise, the image captured by the right side camera 24R may include the image of the part of the vehicle body B other than the road surface.

Especially, when the bird's-eye image is to be generated, the images captured by the front camera 21, the rear camera 22, the left side camera 24L, and the right side camera 24R are processed through a projective transformation so as to attain a viewpoint conversion with which an image seen from above the vehicle body B is obtained, and thus images Tf, Tb, Ts, Ts are created. Then, an image is generated in which the images Tf, Tb, Ts, Ts are mapped around an image of the vehicle body B. It should be noted that means to perform the viewpoint conversion is not limited to the projective transformation, and other transform technique may be used.

As display control unit for displaying any one of images, a monitor control ECU 30 is provided in the vehicle body B.

Though not shown, the monitor control ECU 30 may allow a forward image captured by the front camera 21 and the side image captured by the right side camera 24R to be displayed on the monitor 16 by an optional operation. In this case, the side image captured by the right side camera 24R also corresponds to the top view image in the present invention.

<Display Control System>

FIG. 5 is a schematic diagram of the display control system. The monitor control ECU 30 includes an image interface 31 for acquiring the images captured by the front camera 21, the rear camera 22, the left side camera 24L, and the right side camera 24R. The monitor control ECU 30 further includes: a viewpoint conversion unit 32 as viewpoint conversion means for generating the bird's-eye image from four images acquired through the image interface 31; and a parking assist image composite section 33 for making a composite image from an image captured by the rear camera 22 and a parking assist image.

The monitor control ECU 30 is further provided with a selector 34 for selecting any one of images from among: the bird's-eye image generated by the viewpoint conversion unit 32; the composite image obtained from the image captured by the rear camera 22 with which the parking assist image is combined by the parking assist image composite section 33; the side image captured by the left side camera 24L; and the navigation image generated by the navigation system 25. The monitor control ECU 30 is further provided with the display mode selecting section 35 for controlling the selector 34, and an operation setting section 36 for setting an operation form of the display mode selecting section 35.

The viewpoint conversion unit 32 has a signal system for inputting signals from the steering angle sensor 11 and the moving distance sensor 12, and creates the images Tf, Tb, Ts, Ts through the projective transformation of the four images captured by the front camera 21, the rear camera 22, the left side camera 24L, and the right side camera 24R and acquired through the image interface 31, so as to attain the viewpoint conversion with which the image seen from above the vehicle body B is obtained. Then, by mapping the images Tf, Tb, Ts, Ts around the image of the vehicle body B, the bird's-eye image (VT) seen from above the vehicle body B is generated (see FIG. 7).

The parking assist image composite section 33 makes a composite image from the image captured by the rear camera 22 and the parking assist image, in such a manner that the parking assist image, such as an area to which the vehicle body B is led, and an area where the vehicle body B reaches when moving a set distance, is superimposed on the road surface, and to display the composite image on the monitor 16.

The display mode selecting section 35 is provided with a microprocessor (not shown), and outputs a control signal to the selector 34, based on signals input from the shift position sensor 7S, the monitor posture sensor 17, and the display selection switch 18.

The display mode selecting section 35 is provided with a software for selecting any one of a navigation image display mode, a rearward image display mode, and a top view image display mode. Based on a set signal from the operation setting section 36, the display mode selecting section 35 performs a processing relevant to the images acquired from four cameras as described in this first embodiment, as well as a processing relevant to the images acquired from less than four cameras which will be described later.

The navigation image display mode is selected when the monitor 16 is set to the horizontally elongated posture, and at the same time, the shift position detected by the shift position sensor 7S is in a position other than a reverse position. On the other hand, the rearward image display mode is selected when the monitor 16 is set to the horizontally elongated posture, and at the same time, the shift position detected by the shift position sensor 7S is in the reverse position. With this configuration, when the monitor 16 is set to the horizontally elongated posture and the shift lever 7 is operated to the reverse position, the display on the monitor 16 is shifted from the navigation image display mode to the rearward image display mode.

When the display mode is in the rearward image display mode and the monitor 16 is switched from the horizontally elongated posture to the vertically elongated posture, the display on the monitor 16 is shifted from the rearward image display mode to the top view image display mode. In the top view image display mode, one of the bird's-eye image generated by the viewpoint conversion unit 32 and the side image captured by the left side camera 24L is displayed on the monitor 16, based on a selection with the display selection switch 18.

<Display Control>

Figure 6:
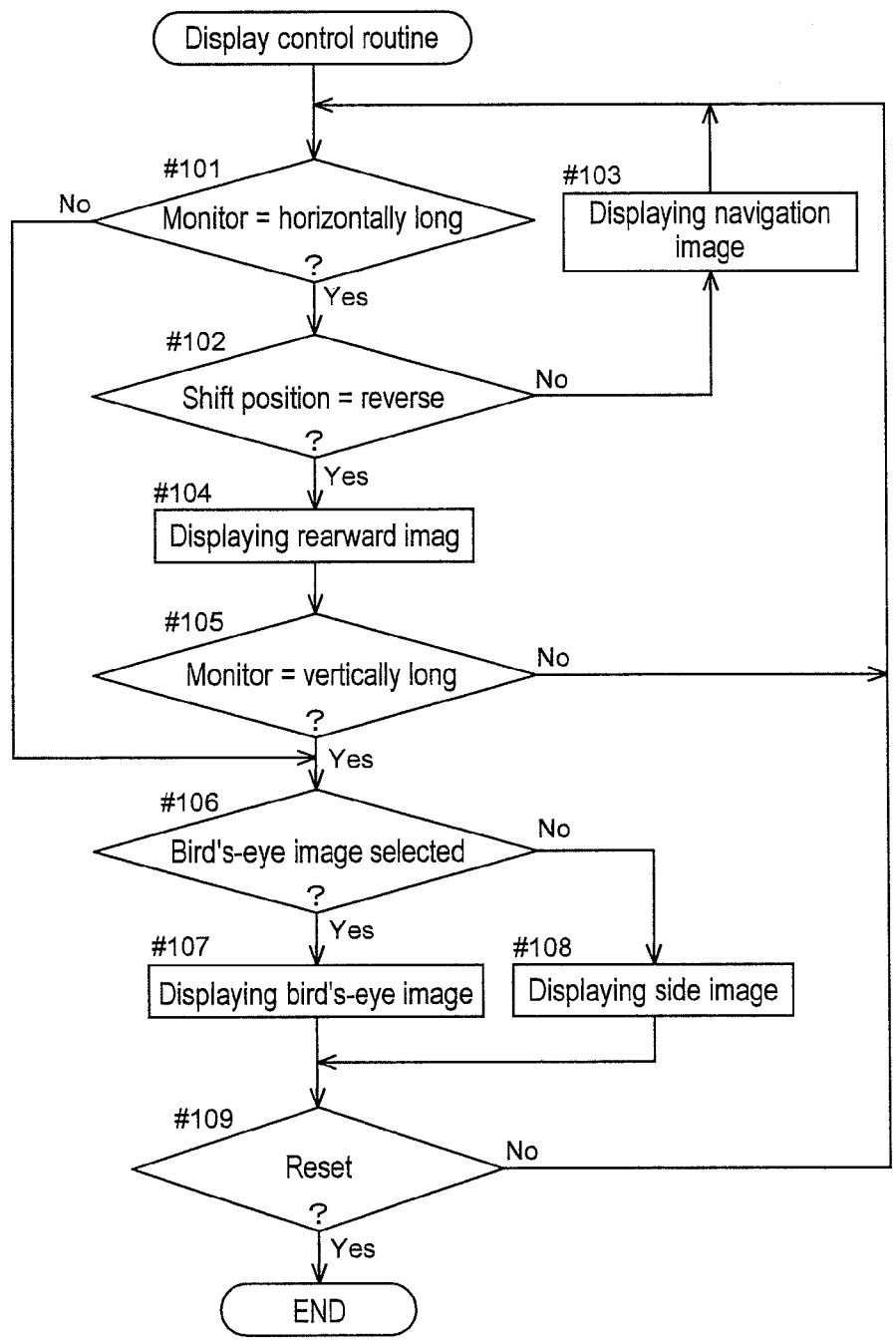
FIG. 6 is a flow chart of a display control routine in the first embodiment.

In the display device according to the present invention, the display mode selecting section 35 selects the image to be displayed on the monitor 16, based on the posture of the monitor 16 and the shift position of the shift lever 7. The outline of the control form is shown in a flow chart of FIG. 6. In addition, the display states of the monitor 16 corresponding to this control form are shown in FIG. 7.

When the monitor 16 is set to the horizontally elongated posture and the shift lever 7 is in the shift position other than the reverse position (shift position≠R), the navigation image (HN) is displayed on the monitor 16 (steps #101-#103).

This processing is performed when the following conditions are met: it is determined that the monitor 16 is in the horizontally elongated posture, based on a detection result by the monitor posture sensor 17; and it is determined that the shift lever 7 is set to the shift position other than the reverse position (shift position≠R), based on the detection result by the shift position sensor 7S.

When the conditions are met, the display mode selecting section 35 selects the navigation image display mode, and the selector 34 selects the navigation image (FIN) generated by the navigation system 25. It should be noted that the navigation image is to be displayed in the present embodiment, or alternatively, the forward image captured by the front camera 21 may be displayed on the monitor 16.

Next, when it is determined based on the detection result by the shift position sensor 7S that the shift position of the shift lever 7 is operated to the reverse position (shift position=R), the rearward image (HR) is displayed on the monitor 16 (steps #102 and #104).

In this processing, the display mode selecting section 35 selects the rearward image display mode, and the selector 34 selects the rearward image (HR) from the rear camera 22 with which the parking assist image is combined by the parking assist image composite section 33.

When the shift lever 7 is in the reverse position (shift position=R) and the monitor 16 is switched from the horizontally elongated posture to the vertically elongated posture, the top view image is displayed. As the top view image, the bird's-eye image (VT) or the side image (VL) is displayed, based on the selection with the display selection switch 18. The control continues until it is reset (steps #101 and #105-#109). It should be noted that, in addition to this control, a control form may be set in such a manner that, when the shift lever 7 is in the shift position other than the reverse position (shift position≠R) and the monitor 16 is switched from the horizontally elongated posture to the vertically elongated posture, the bird's-eye image (VT) is displayed.

In this control, when it is determined based on the detection result by the monitor posture sensor 17 that the monitor 16 is in the vertically elongated posture, the display mode selecting section 35 selects for the display either the bird's-eye image (VT) generated by the viewpoint conversion unit 32, or the side image (VL) captured by the left side camera 24L based on the selection with the display selection switch 18, and the selector 34 selects and outputs the image in accordance with the selection result by the display mode selecting section.

It should be noted that a push operation type switch is assumed as the display selection switch 18, and the bird's-eye image (VT) and the side image (VL) are switched every time a push operation is performed, or alternatively, the display selection switch 18 may be a switch in which one of two operation positions is selected, such as toggle switch and slide switch.

Once the monitor 16 is set to the vertically elongated posture and the top view image of either the bird's-eye image (VT) or the side image (VL) is displayed on the monitor 16, the bird's-eye image (VT) or the side image (VL) is retained to be displayed regardless of the operation position of the shift lever 7. With this configuration, even when the backward movement and the forward movement of the vehicle body B are repeated, the top view image is retained to be displayed, and thus the region which otherwise cannot be visually checked by the driver can be recognized through the monitor 16.

Afterward, when the monitor 16 is switched to the horizontally elongated posture and the shift lever 7 is in the reverse position (shift position=R), the rearward image (HR) is displayed on the monitor 16. On the other hand, when the shift lever 7 is in the shift position other than the reverse position (shift position≠R), the navigation image (FIN) is displayed on the monitor 16.

With this display configuration, by utilizing the posture of the monitor 16 and the shift position, when the vehicle body B is moved backward to the parking position, it becomes possible to check the condition rearward of the vehicle body B, as well as the road surface condition around the vehicle body B through the top view image, and the road surface on the left side of the vehicle body through the side image.

Modified Version of First Embodiment

Figure 8:
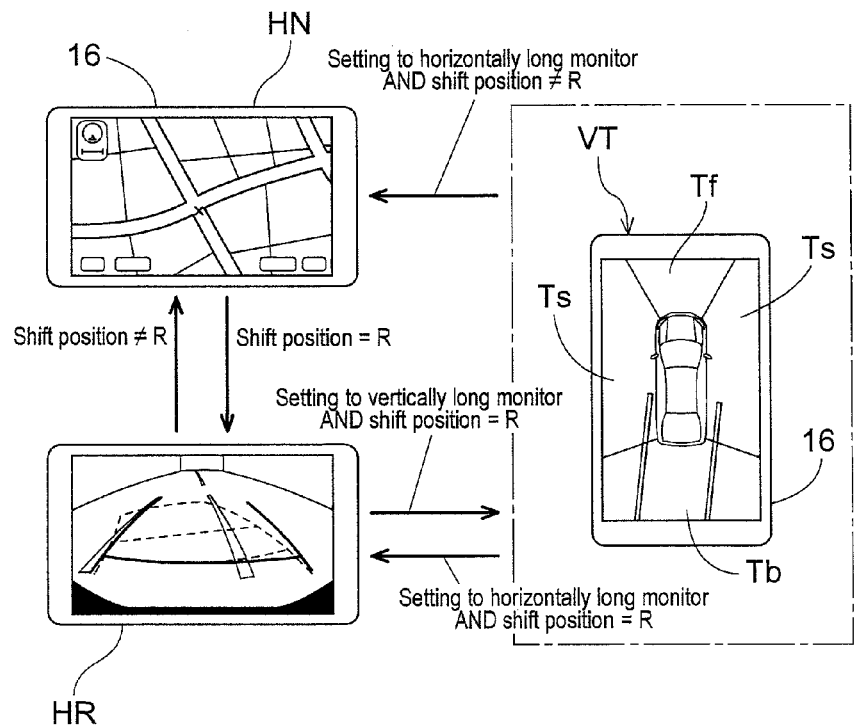
FIG. 8 is a diagram showing the posture of the monitor and the image displayed on the monitor in a modified version of the first embodiment.

Especially, as a modified version of the first embodiment, the display selection switch 18 may be absent, and the control form may be set in such a manner that the bird's-eye image (VT) alone is displayed on the monitor 16, as shown in FIG. 8, when the conditions for displaying the top view image are met.

The display in this case can be achieved by inputting the set signal for setting the display mode to the operation setting section 36 in the monitor control ECU 30. In other words, the above-described display of the different images can be achieved by using the monitor control ECU 30 having the same configuration.

<Second Embodiment>

Figure 9:
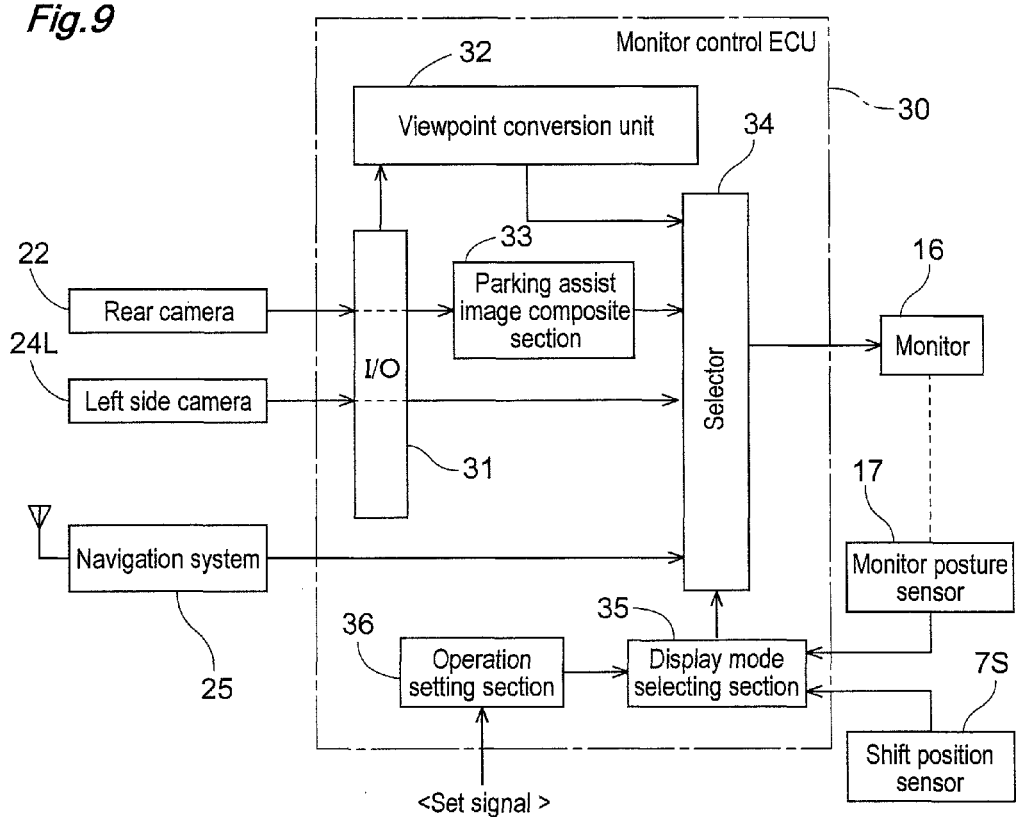
FIG. 9 is a block circuit diagram showing a control system in a second embodiment.

As shown in FIG. 9, this second embodiment is different from the first embodiment in that only the rear camera 22 and the left side camera 24L are provided, and the front camera 21, the right side camera 24R, and the display selection switch 18 are absent. With this configuration, the side image captured by the left side camera 24L is displayed on the monitor 16 as the top view image.

<Display Control>

Figure 10:
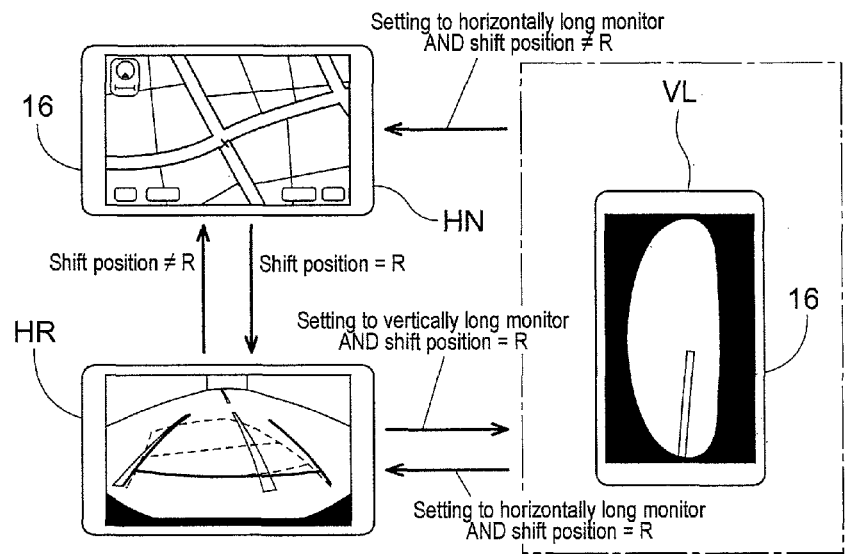
FIG. 10 is a diagram showing the posture of the monitor and the image displayed on the monitor in the second embodiment.

In this second embodiment also, like in the first embodiment, the display mode selecting section 35 sets the image to be displayed on the monitor 16, based on the posture of the monitor 16 detected by the monitor posture sensor 17 and the shift position of the shift lever 7 detected by the shift position sensor 7S. The states of the monitor 16 in this display control are shown in FIG. 10.

Specifically, like in the first embodiment, when the monitor 16 is set to the horizontally elongated posture and it is determined that the shift lever 7 is in the shift position other than the reverse position (shift position≠R), the navigation image (FIN) is displayed on the monitor 16.

Next, when the shift lever is operated to the reverse position (shift position=R), the rearward image (HR) is displayed on the monitor 16.

Next, when the shift lever 7 is in the reverse position (shift position=R) and the monitor 16 is switched from the horizontally elongated posture to the vertically elongated posture, the side image (VL) is displayed as the top view image. It should be noted that, in addition to this control, a control form may be set in such a manner that, when the shift lever 7 is in the shift position other than the reverse position (shift position≠R) and the monitor 16 is switched from the horizontally elongated posture to the vertically elongated posture, the bird's-eye image (VT) is displayed.

Afterward, when the monitor 16 is switched to the horizontally elongated posture and the shift lever 7 is in the reverse position (shift position=R), the rearward image (HR) is displayed on the monitor 16, and when the shift lever 7 is in the shift position other than the reverse position (shift position≠R), the navigation image (HN) is displayed on the monitor 16.

With this display configuration, by utilizing the posture of the monitor 16 and the shift position, when the vehicle body B is moved backward to the parking position, it becomes possible to check the condition rearward of the vehicle body B, as well as the road surface condition around the vehicle body B through the top view image.

The display in the second embodiment can be achieved by using the same monitor control ECU 30 as that described in the first embodiment, and inputting the set signal for setting the display mode to the operation setting section 36.

<Third Embodiment>

Figure 11:
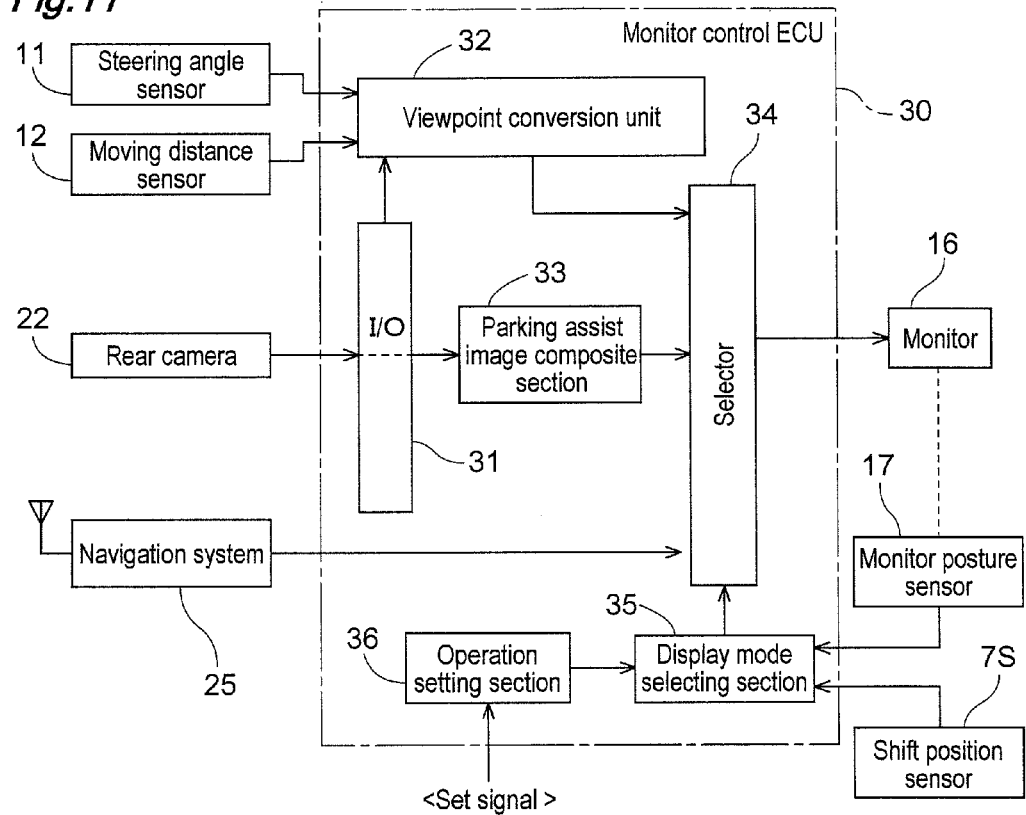
FIG. 11 is a block circuit diagram showing a control system in a third embodiment.

As shown in FIG. 11, this third embodiment is different from the first embodiment in that only the rear camera 22 is provided, and the front camera 21, the right side camera 24R, the left side camera 24L, and the display selection switch 18 are absent. With this configuration, the bird's-eye image generated by the viewpoint conversion unit 32 is displayed on the monitor 16 as the top view image.

<Display Control>

Figure 12:
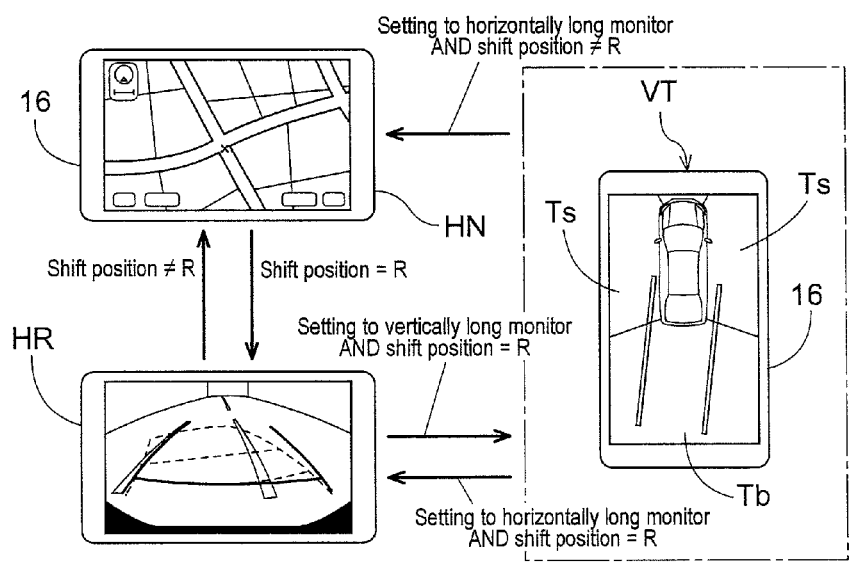
FIG. 12 is a diagram showing the posture of the monitor and the image displayed on the monitor in the third embodiment.

In this third embodiment also, like in the first embodiment, the display mode selecting section 35 sets the image to be displayed on the monitor 16, based on the posture of the monitor 16 detected by the monitor posture sensor 17 and the shift position of the shift lever 7 detected by the shift position sensor 7S. The states of the monitor 16 in this display control are shown in FIG. 12.

Specifically, like in the first embodiment, when the monitor 16 is set to the horizontally elongated posture and it is determined that the shift lever 7 is in the shift position other than the reverse position (shift position≠R), the navigation image (FIN) is displayed on the monitor 16.

Next, when the shift lever 7 is shifted to the reverse position (shift position=R), the rearward image (HR) is displayed on the monitor 16.

Next, when the shift lever 7 is in the reverse position (shift position=R) and the monitor 16 is switched from the horizontally elongated posture to the vertically elongated posture, the bird's-eye image (VT) is displayed as the top view image. It should be noted that, in addition to this control, a control form may be set in such a manner that, when the shift lever 7 is in the shift position other than the reverse position (shift position≠R) and the monitor 16 is switched from the horizontally elongated posture to the vertically elongated posture, the bird's-eye image (VT) is displayed.

In this third embodiment, for the bird's-eye image (VT), a rearward image (Tb) showing a view rearward of the vehicle body B is to be displayed, and a display form is set in such a manner that the rearward image (Tb) showing the view rearward of the vehicle body B is displayed relatively far from the vehicle body B. In addition, when the vehicle body B is moved backward, in conjunction with this backward movement, the rearward images (Tb) which have been displayed already are mapped as side images (Ts) showing side views from the vehicle body B, so that the road surface condition can be recognized through the side images (Ts) showing the both lateral side views from the vehicle body B on the monitor 16.

It should be noted that this processing of the displayed rearward images (Tb) to obtain the side images (Ts) showing the side views from the vehicle body B is not necessarily performed, and the processing form for displaying the bird's-eye image may be set in such a manner that the rearward image (Tb) showing the view rearward of the vehicle body B alone is displayed on the monitor 16.

Afterward, when the monitor 16 is switched to the horizontally elongated posture and the shift lever 7 is in the reverse position (shift position=R), the rearward image (HR) is displayed on the monitor 16. On the other hand, when the shift lever 7 is in the shift position other than the reverse position (shift position≠R), the navigation image (FIN) is displayed on the monitor 16.

With this display configuration, by utilizing the posture of the monitor 16 and the shift position, when the vehicle body B is moved backward to the parking position, it becomes possible to check the condition rearward of the vehicle body B, as well as the road surface condition on the rear side of the vehicle body B through the top view image.

The display in the third embodiment also can be achieved by using the same monitor control ECU 30 as that described in the first embodiment, and inputting the set signal for setting the display mode to the operation setting section 36.

<Fourth Embodiment>

Figure 13:
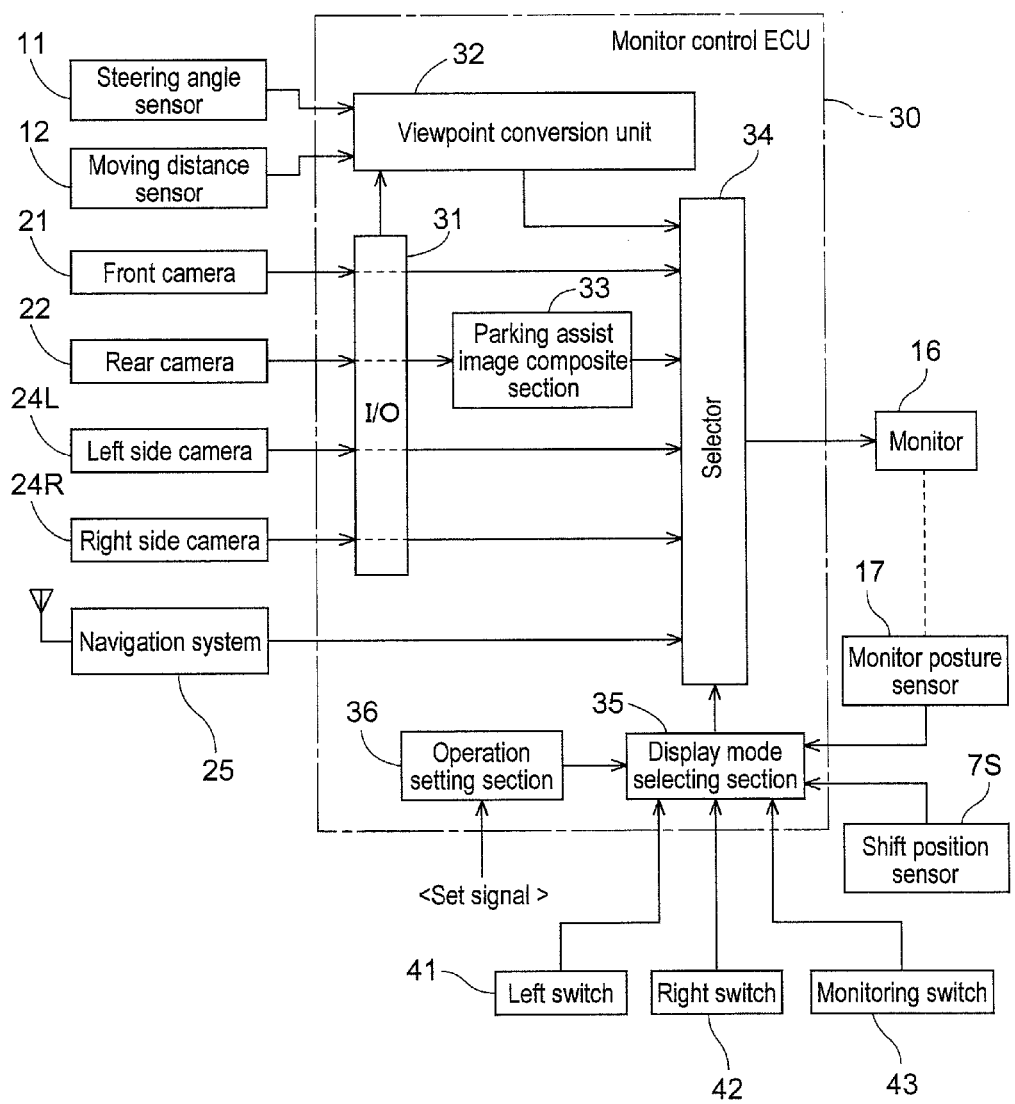
FIG. 13 is a block circuit diagram showing a control system in a fourth embodiment.

As shown in FIG. 13, like the first embodiment, this fourth embodiment is provided with the front camera 21, the rear camera 22, the left side camera 24L, and the right side camera 24R, and further with a left switch 41, a right switch 42, and a monitoring switch 43.

It should be noted that, in the case of the monitor 16 whose display face has the touch panel, at least one of the left switch 41, the right switch 42 and the monitoring switch 43 may be displayed as operation button on the monitor 16. By using the touch panel, the number of switches having electrical contact can be reduced.

<Display Control>

Figure 14:
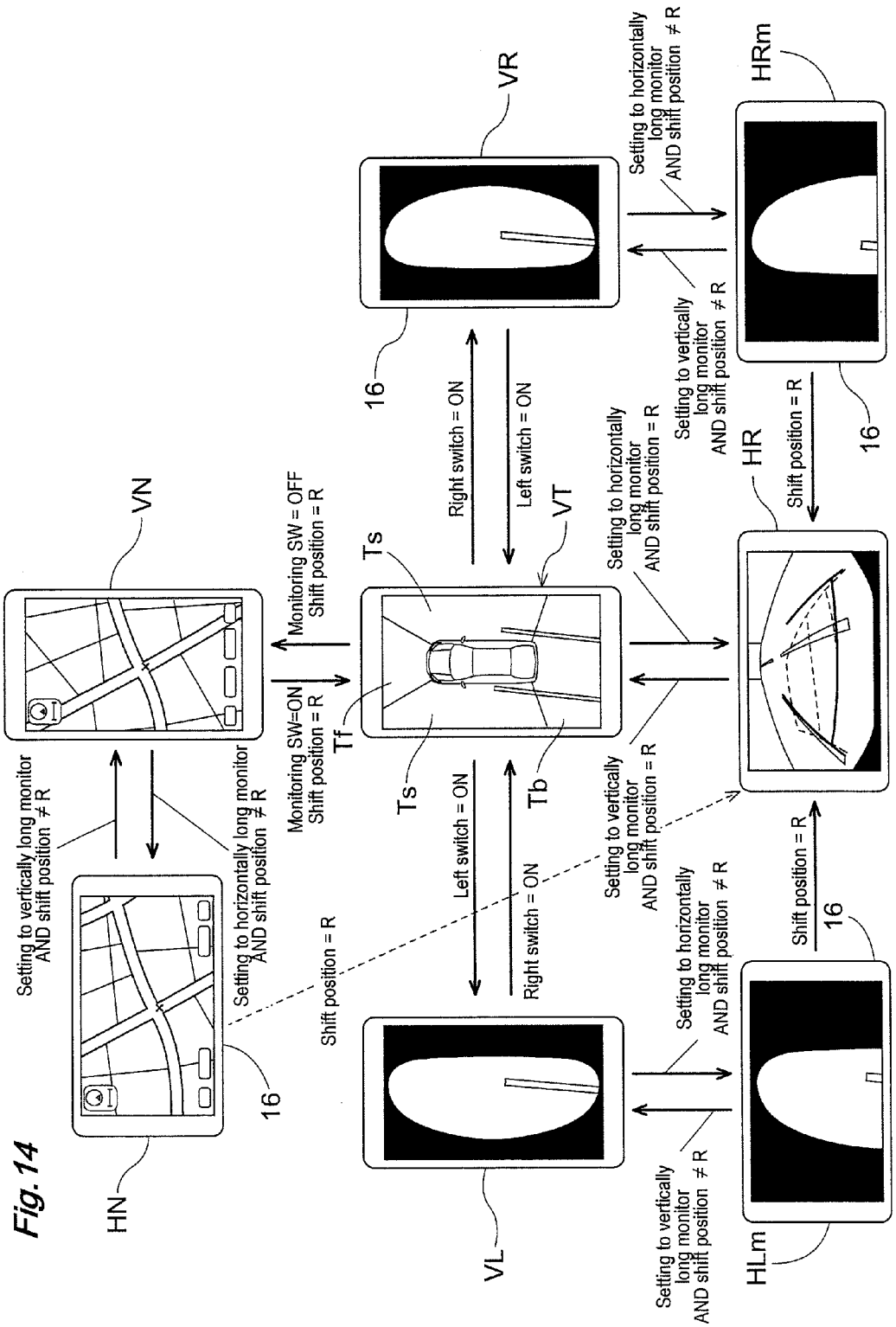
FIG. 14 is a diagram showing the posture of the monitor and the image displayed on the monitor in the fourth embodiment.

In this fourth embodiment also, like in the first embodiment, the display mode selecting section 35 sets the image to be displayed on the monitor 16, based on the posture of the monitor 16 detected by the monitor posture sensor 17, the shift position of the shift lever 7 detected by the shift position sensor 7S, the left switch 41, the right switch 42, and the monitoring switch 43. The states of the monitor 16 in this display control are shown in FIG. 14.

Specifically, when the monitor 16 is in the horizontally elongated posture, the navigation image (HN) is displayed, and when the monitor 16 is switched from the horizontally elongated posture to the vertically elongated posture and the shift lever 7 is in the shift position other than the reverse position (shift position≠R), a navigation image (VN) is consecutively displayed.

In this vertically elongated posture, when the monitoring switch (monitoring SW) 43 is in an ON state and the shift position of the shift lever 7 is set to the reverse position (shift position=R), the bird's-eye image (VT) is displayed on the monitor 16 as the top view image. When the monitoring switch 43 is turned off while the bird's-eye image (VT) is displayed, the navigation image (VN) is displayed while the vertically elongated posture is retained.

When the left switch 41 is turned on while the bird's-eye image (VT) is displayed, the side image (VL) captured by the left side camera 24L is displayed on the monitor 16 as the top view image. Likewise, when the right switch 42 is turned on, a side image (VR) captured by the right side camera 24R is displayed on the monitor 16 as the top view image. In addition, when the right switch 42 is turned on while the left side image (VL) is displayed on the monitor 16, or when the left switch 41 is turned on while the right side image (VR) is displayed on the monitor 16, the bird's-eye image (VT) is displayed as the top view image.

When the monitor 16 is switched from the vertically elongated posture to the horizontally elongated posture and the shift lever 7 is in the shift position other than the reverse position (shift position≠R) while the left side image (VL) is displayed on the monitor 16, a side image (HLm) which is obtained by enlarging the image captured by the left side camera 24L is displayed on the monitor 16 as the top view image. Likewise, when the monitor 16 is switched from the vertically elongated posture to the horizontally elongated posture and the shift lever 7 is in the shift position other than the reverse position (shift position≠R) while the right side image (VR) is displayed on the monitor 16, a side image (HRm) which is obtained by enlarging the image captured by the right side camera 24R is displayed on the monitor 16 as the top view image. In these cases, an operation button for altering a position of the enlarged image may be displayed on the monitor 16, and a position of a region to be enlarged in the side image may be shifted in accordance with the operation of the operation button.

When the shift lever 7 is retained at the reverse position (shift position=R) and the monitor 16 is switched from the vertically elongated posture to the horizontally elongated posture while the bird's-eye image (VT) is displayed, the rearward image (HR) is displayed on the monitor 16. The rearward image (HR) is displayed also when the shift lever 7 is operated to the reverse position (shift position=R) while the monitor 16 is in the horizontally elongated posture and the navigation image (FIN) is displayed.

When the shift lever 7 is operated to the reverse position (shift position=R) while the enlarged side image (HLm) is displayed on the monitor 16 as described above, or when the shift lever 7 is operated to the reverse position (shift position=R) while the enlarged side image (HRm) is displayed on the monitor 16 as described above, the rearward image (HR) is displayed on the monitor 16.

With this display configuration, it becomes possible to check the road surface condition around the vehicle body through the top view image on the monitor 16, as well as the condition in the vicinity of the right or left side of the vehicle body B selected by the driver. Moreover, it is also possible to check the details in the vicinity of the vehicle body B through the enlarged image.

The display in the fourth embodiment can be achieved by using the same monitor control ECU 30 as that described in the first embodiment, and inputting the set signal for setting the display mode to the operation setting section 36.

<Fifth Embodiment>

Figure 17:
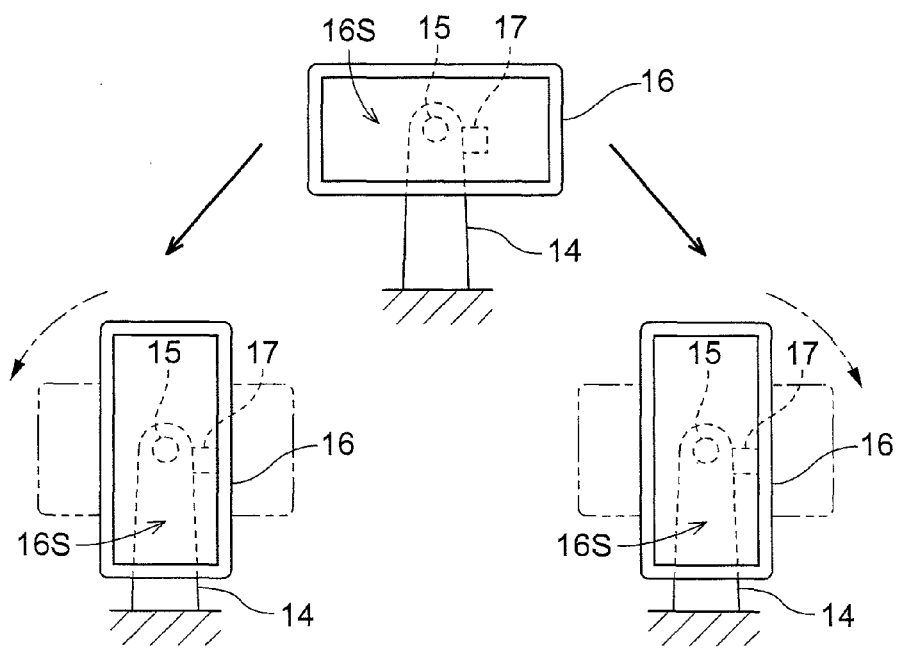
FIG. 17 is a diagram showing a rotational posture change of the monitor in the fifth embodiment.

In the present embodiment, as shown in FIG. 17, the monitor 16 is configured so that the display face 16S is switchable between the horizontally elongated posture as a standard posture and the vertically elongated posture, through a left rotation or a right rotation about the rotation shaft 15 by the manual operation. In other words, the monitor 16 is supported by the rotation shaft 15 rotatably in a range of 90 degrees to the right or left, from the horizontally elongated posture as the standard posture. With this configuration, the monitor 16 is switchable to either a left rotation posture as the vertically elongated posture in which a left end side of the monitor 16 in the standard posture is moved downward or a right rotation posture as the vertically elongated posture in which a right end side of the monitor 16 in the standard posture is moved downward.

Figure 15:
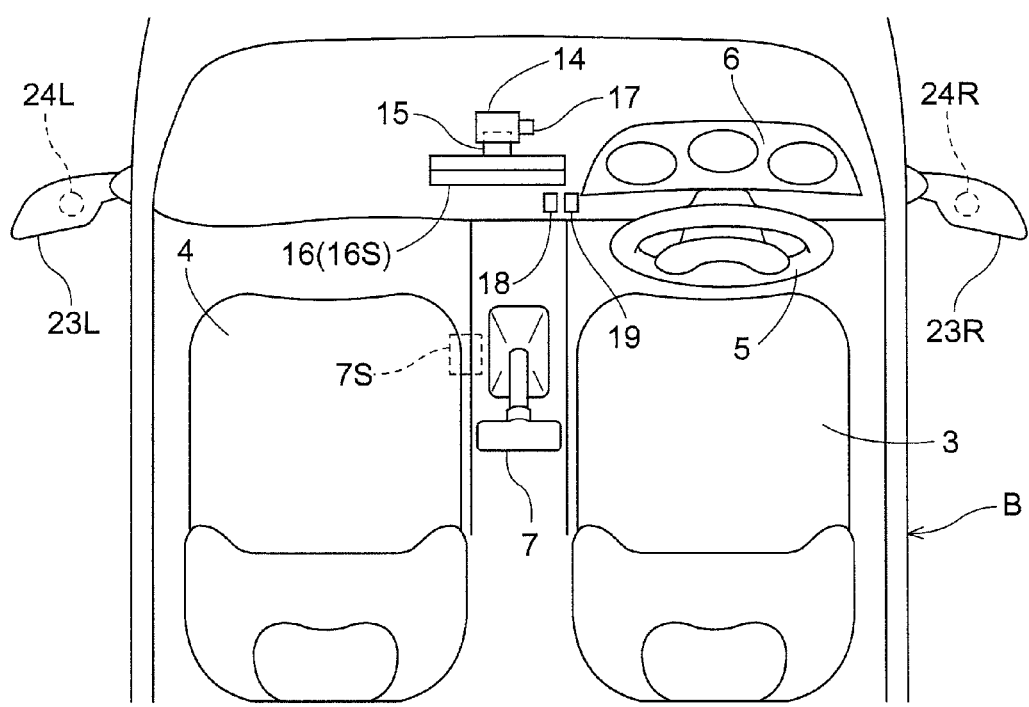
FIG. 15 is a plan view showing the portion near the driver's seat in a fifth embodiment.
Figure 16:
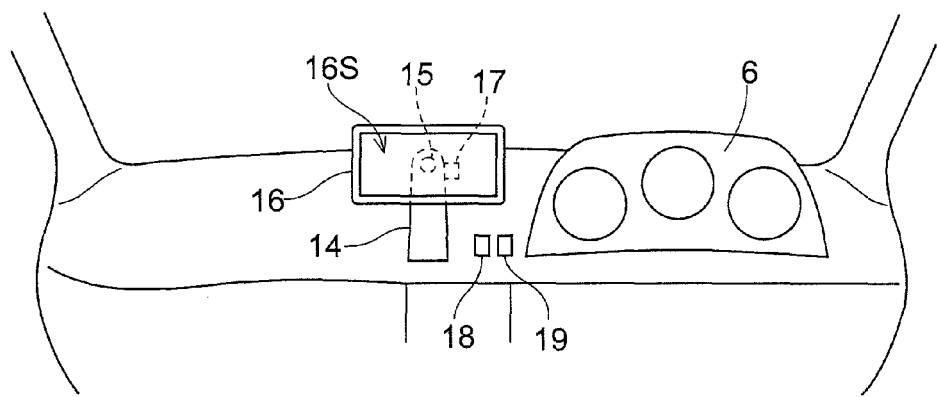
FIG. 16 is a diagram showing an arrangement of the monitor in the fifth embodiment.

In addition, the monitor posture sensor 17 according to the present embodiment is configured to detect which one of the standard posture, the left rotation posture, and the right rotation posture the monitor is in, and the display selection switch 18 is configured to select an image to be displayed on the monitor 16 in the standard posture. Further, as shown in FIGS. 15 and 16, in the present embodiment, there is provided a bird's-eye image display switch 19 for displaying the bird's-eye image on the monitor 16 in the left rotation posture or the right rotation posture.

The monitor posture sensor 17 outputs signals corresponding to the standard posture, the left rotation posture and the right rotation posture, by combining limit switches, reed switches or the like, or using a rotary encoder or the like. Each of the display selection switch 18 and the bird's-eye image display switch 19 may be of a momentary type or a toggle-type. It should be noted that, in present embodiment, a configuration with the momentary type is described, and the display mode selecting section 35 (see FIG. 18) determines that the switch is in an OFF state when not operated, the switch is in an ON state when a pushing operation is performed, and the switch is in the OFF state when another pushing operation is performed.

In addition, in the case of the monitor 16 whose display face has the touch panel, at least one of the display selection switch 18 and the bird's-eye image display switch 19 may be displayed as operation button on the monitor 16. By using the touch panel as described above, the number of the switches having electrical contact can be reduced.

It should be noted that the other configurations are the same as those in the first embodiment.

<Display Control System>

Figure 18:
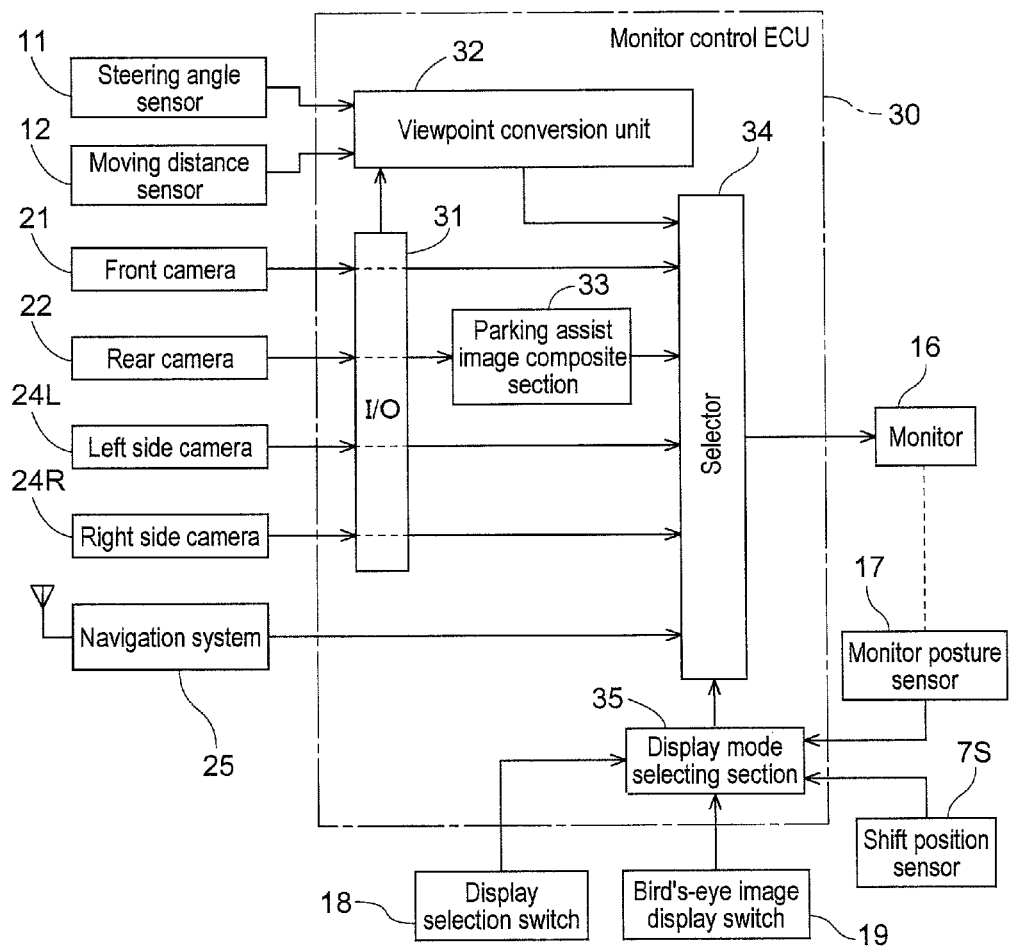
FIG. 18 is a block circuit diagram showing a control system in the fifth embodiment.

FIG. 18 is a schematic diagram of the display control system. It should be noted that the same components as those in the first embodiment are designated with the same reference characters, and thus a duplicate description is omitted.

The display mode selecting section 35 according to the present embodiment supplies the selector 34 with information corresponding to a plurality of display modes which will be described below, based on the signals input from the shift position sensor 7S, the monitor posture sensor 17, the display selection switch 18, and the bird's-eye image display switch 19, and the selector 34 switches the image displayed on the monitor 16, in accordance with the information from the display mode selecting section 35.

The display mode selecting section 35 is provided with the software for selecting any one of a forward image display mode, the navigation image display mode, the rearward image display mode, a side image display mode, and a bird's-eye image display mode.

The forward image display mode is selected when the display selection switch 18 is turned off while the monitor 16 is set to the standard posture (horizontally elongated posture). In other words, in conjunction with the OFF operation of the display selection switch 18, the image to be displayed on the monitor 16 is shifted to the image captured by the front camera 21.

The navigation image display mode is selected when the monitor 16 is set to the standard posture (horizontally elongated posture), the display selection switch 18 is in the ON state, and the shift position detected by the shift position sensor 7S is in the position other than the reverse position. In other words, in a case where the monitor 16 is in the standard posture and the display selection switch 18 is in the ON state, when the shift position sensor 7S detects that the shift position reaches the position other than the reverse position, in conjunction with this, the image to be displayed on the monitor 16 is shifted to the navigation image.

The rearward image display mode is selected when the monitor 16 is set to the standard posture (horizontally elongated posture) and the shift position detected by the shift position sensor 7S is in the reverse position. In other words, in a case where the monitor 16 is in the standard posture, when the shift position sensor 7S detects that the shift position reaches the reverse position, in conjunction with this, the image to be displayed on the monitor 16 is shifted to the image captured by the rear camera 22.

The side image display mode is selected when the monitor 16 is switched from the standard posture to the left rotation posture or the right rotation posture. When the monitor 16 is switched from the standard posture to the left rotation posture, a left road surface image (image of the left road surface) captured by the left side camera 24L is selected, and when the monitor 16 is switched from the standard posture to the right rotation posture, a right road surface image (image of the right road surface) captured by the right side camera 24R is selected. In other words, in conjunction with the switching of the posture of the monitor 16, the image to be displayed on the monitor 16 is shifted from the standard image which will be described later to the left road surface image or the right road surface image. In the present embodiment, the left road surface image and the right road surface image correspond to the top view image in the present invention.

The bird's-eye image display mode is selected when the monitor 16 is in the left rotation posture or the right rotation posture and the bird's-eye image display switch 19 is turned on, and then the bird's-eye image generated by the viewpoint conversion unit 32 is selected to be displayed on the monitor 16. In other words, in conjunction with the ON operation of the bird's-eye image display switch 19, the image to be displayed on the monitor 16 is shifted to the bird's-eye image.

<Display Control>

Figure 19:
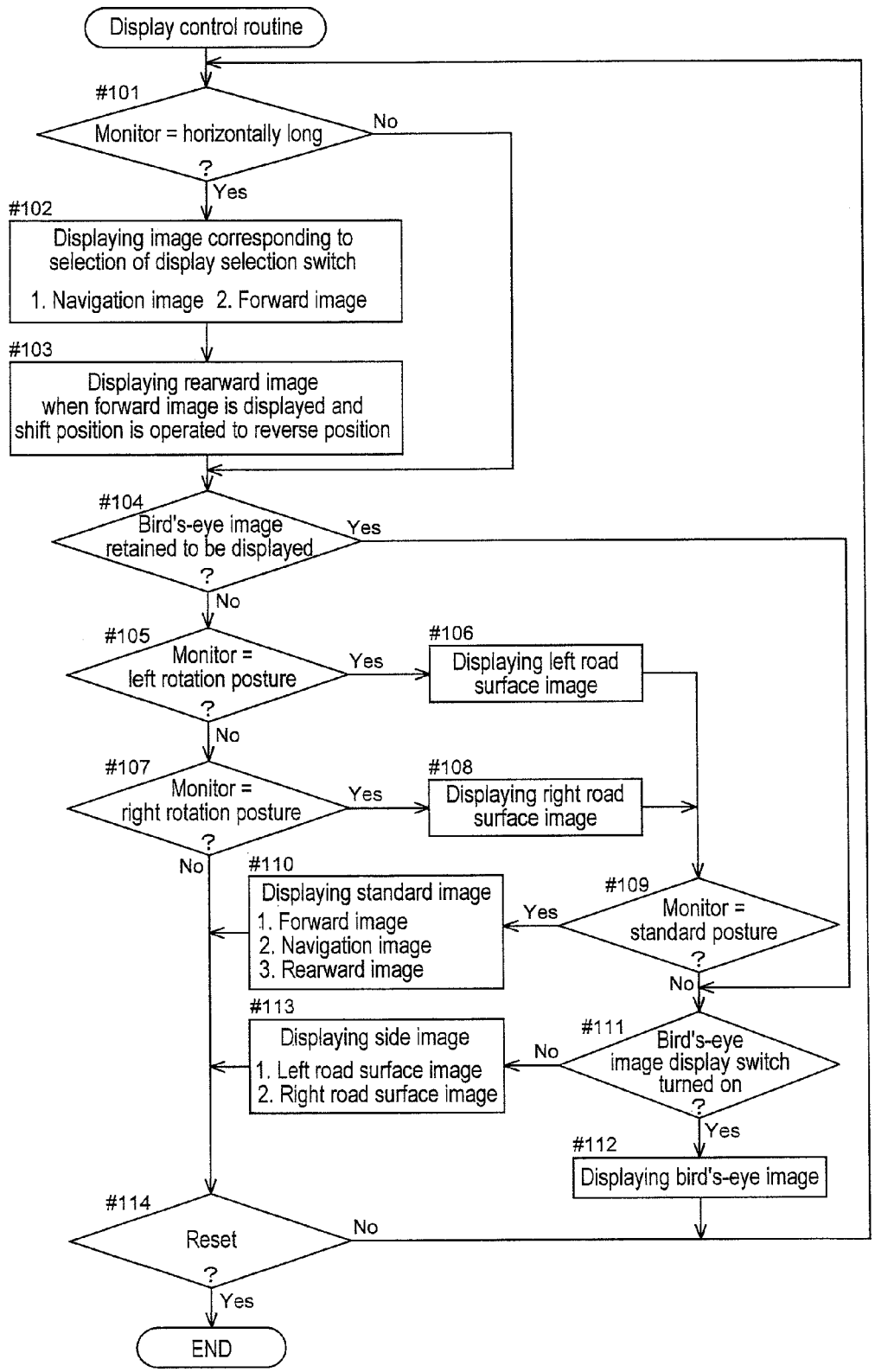
FIG. 19 is a flow chart of a display control routine in the fifth embodiment.
Figure 20:
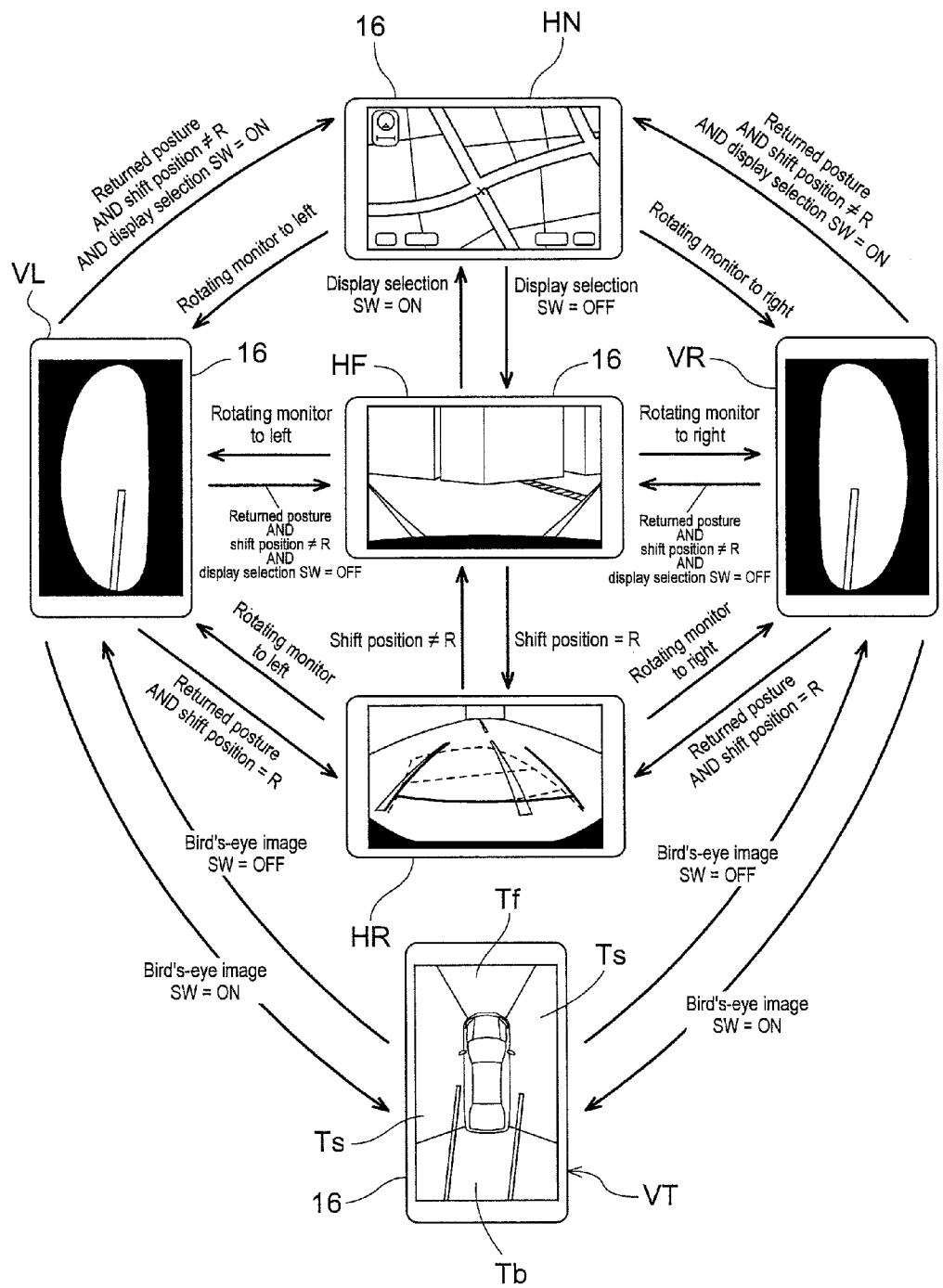
FIG. 20 is a diagram showing the posture of the monitor and the image displayed on the monitor in the fifth embodiment.

In the display device according to the present embodiment, the display mode selecting section 35 selects the image to be displayed on the monitor 16, based on the posture of the monitor 16 and the shift position of the shift lever 7. The outline of the control form is shown in a flow chart of FIG. 19. In addition, the display states of the monitor 16 corresponding to this control form are shown in FIG. 20.

When the monitor 16 is in the standard posture and the display selection switch (display selection SW) 18 is in the OFF state, a forward image (HF) is displayed on the monitor 16. When the display selection switch 18 is turned on, the navigation image (HN) is displayed on the monitor 16. When the display selection switch 18 is in the OFF state and the shift lever 7 is in the reverse position (shift position=R), the rearward image (HR) is displayed on the monitor 16 (steps #101-#103).

These forward image (HF), navigation image (HN), and rearward image (HR) correspond to the standard image in the present invention. In the case where any one of these three standard images is displayed, when the monitor 16 is switched to the left rotation posture, the left road surface image (VL) is displayed, and when the monitor 16 is switched to the right rotation posture, the right road surface image (VR) is displayed (steps #105-#108).

In other words, when the monitor 16 in the standard posture is rotated to the left to be switched to the vertically elongated posture (left rotation posture), the road surface image on the left side of the vehicle body B is displayed on the monitor 16. When the monitor 16 in the standard posture is rotated to the right to be switched to the vertically elongated posture (right rotation posture), the road surface image on the right side of the vehicle body B is displayed on the monitor 16.

As described above, after the monitor 16 is switched from the standard posture to the vertically elongated posture (left rotation posture or right rotation posture), when the monitor 16 is returned to the standard posture, any one of the forward image (HF), the navigation image (HN), and the rearward image (HR) is displayed on the monitor 16 (steps #109 and #110).

As a specific display form, in a case where the monitor 16 is returned from the vertically elongated posture (left rotation posture or right rotation posture) to the standard posture, when the shift lever 7 is in the shift position other than the reverse position (shift position≠R) and the display selection switch 18 is in the OFF state, the forward image (HF) is displayed on the monitor 16.

In the case where the monitor 16 is returned from the vertically elongated posture (left rotation posture or right rotation posture) to the standard posture, when the shift position of the shift lever 7 is in the reverse position (shift position=R), the rearward image (HR) is displayed on the monitor 16.

Further, in the case where the monitor 16 is returned from the vertically elongated posture (left rotation posture or right rotation posture) to the standard posture, when the shift lever 7 is in the shift position other than the reverse position (shift position≠R) and the display selection switch 18 is in the ON state, the navigation image (HN) is displayed on the monitor 16.

In a case where the monitor 16 is in the right rotation posture or the left rotation posture, when the bird's-eye image display switch (bird's-eye image display SW) 19 is turned on, the bird's-eye image (VT) is displayed on the monitor 16 (steps #111-#113).

In this control, when the bird's-eye image display switch 19 is turned off, the left road surface image (VL) or the right road surface image (VR) is displayed on the monitor 16 instead of the bird's-eye image (VT), and when the bird's-eye image display switch 19 is retained in the OFF state, the display of the left road surface image (VL) or the right road surface image (VR) which has been already displayed is retained (steps #104, #111-#113).

In this control, when the monitor 16 is set to the left rotation posture or the right rotation posture, the image is retained to be displayed even though the shift lever 7 is operated. Therefore, in a case where the shift lever 7 is switched between the reverse position and the position other than the reverse position, such as a case where the vehicle body B is led to the parking position, even when the backward movement and the forward movement of the vehicle body B are repeated, the display on the monitor 16 is retained, and the region which cannot otherwise be visually checked by the driver can be recognized through the monitor 16.

With this display configuration, when the vehicle body B is moved backward to the parking position, by utilizing the posture of the monitor 16 and the shift position, the needed image is displayed on the monitor 16, and thus it becomes possible to check the condition rearward of the vehicle body B through this image. In addition, when the bird's-eye image is displayed, it becomes possible to check the road surface condition around the vehicle body B, and to check the road surface on the left side of the vehicle body through the road surface image.

Industrial Applicability

The present invention can be used in the display device for displaying the image captured by the on-board camera on the monitor provided in the vehicle interior of the vehicle body, such as automobile.

REFERENCE SIGNS LIST

B Vehicle body
T Transmission device
HF Forward image (standard image)
HN Navigation image (standard image)
HB Rearward image (standard image)
VL Side image (top view image)
VT Bird's-eye image (top view image)
HLm Enlarged side image (top view image)
HRm Enlarged side image (top view image)
7S Shift position sensor
Monitor
16S Display face
18 Display selection switch
21 Front camera
22 Rear camera
24L Left side camera (side camera)
24R Right side camera (side camera)
25 Navigation system
32 Viewpoint conversion unit
30 Monitor control ECU (display control unit)

The invention claimed is:

1. A display device comprising: a camera for capturing an image around a vehicle body; a monitor provided in a vehicle interior; and a display control unit for controlling a display on the monitor,
the monitor having a rectangle-shaped display face, and being supported switchably between a vertically elongated posture and a horizontally elongated posture a shift position sensor for detecting a shift position of a transmission device of the vehicle body, and
the display control unit being configured to display a top view image of a road surface around the vehicle body seen from above on the monitor, based on an image captured by the camera, the top view image being displayed based on a determination that the monitor is switched to the vertically elongated posture, and to display the image captured by the camera on the monitor, the image captured by the camera being displayed based on a determination that the monitor is switched to the horizontally elongated posture;
wherein the camera is a rear camera for capturing an image rearward of the vehicle body, the display control unit is configured to shift a display mode to a rearward image display mode in which an image captured by the rear camera is displayed on the monitor, when the monitor is set to the horizontally elongated posture and the shift position sensor detects that the shift position is set to a reverse position, and
the display control unit is configured to shift the display mode to a top view image display mode in which the top view image is displayed instead of the image captured by the rear camera, when the display mode is in the rearward image display mode and the monitor is switched to the vertically elongated posture;
the display control unit is configured to perform a processing of the rearward image display mode in which the image captured by the rear camera is displayed on the monitor instead of the top view image, when the monitor in the top view image display mode is switched to the horizontally elongated posture and the shift position is in the reverse position.

2. The display device according to claim 1,
further comprising a viewpoint conversion unit for converting at least the image captured by the rear camera into a bird's-eye image seen from above the vehicle body,
wherein the display control unit is configured to display the bird's-eye image on the monitor as the top view image when the display mode is in the top view image display mode.

3. The display device according to claim 1,
further comprising a side camera for capturing from above the road surface near a side part of the vehicle body to obtain a side image,
wherein the display control unit is configured to display the side image on the monitor as the top view image when the display mode is in the top view image display mode.

4. The display device according to claim 3, wherein the display control unit is configured to display an image obtained by enlarging the side image as the top view image, when the display mode is in the top view image display mode, the monitor displaying the side image as the top view image is switched to the horizontally elongated posture, and the shift position is in a position other than the reverse position.

5. The display device according to claim 1,
further comprising: a viewpoint conversion unit for converting at least the image captured by the rear camera into a bird's-eye image seen from above the vehicle body;
and a side camera for capturing from above the road surface near a side part of the vehicle body to obtain a side image,
wherein the display control unit is configured to select one of the bird's-eye image and the side image in accordance with an operation of a display selection switch and to display the selected image on the monitor as the top view image, when the display mode is in the top view image display mode.

6. The display device according to claim 1,
further comprising a navigation system for acquiring a position of the vehicle body as position information represented by the terrestrial longitude and latitude and for generating a navigation image in which a position specified by the acquired position information is indicated on a corresponding map,
wherein the display control unit is configured to perform a processing of a navigation image display mode in which the navigation image is displayed instead of the top view image, when the monitor in the top view image display mode is switched to the horizontally elongated posture and the shift position is in a position other than the reverse position.

* * * * *